J. C. & L. C. PLUCHE.
Harvester.
No. 15,146.
Patented June 17, 1856.
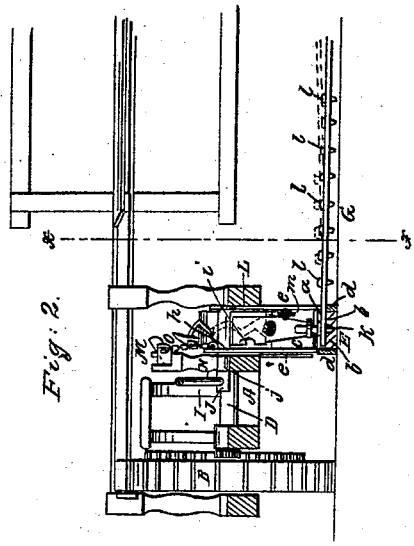
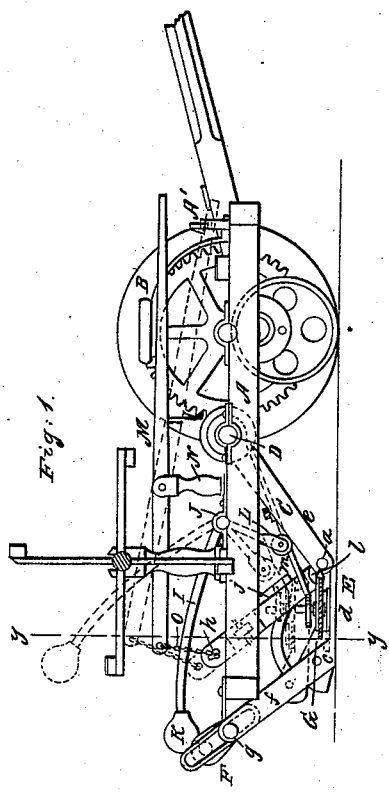

UNITED STATES PATENT OFFICE.

J. C. PLUCHE AND L. C. PLUCHE, OF CAPE VINCENT, NEW YORK.

IMPROVEMENT IN HARVESTERS.

Specification forming part of Letters Patent No. 15,146, dated June 17, 1856.

*To all whom it may concern:*

Be it known that we, J. C. PLUCHE and L. C. PLUCHE, of Cape Vincent, in the county of Jefferson and State of New York, have invented a new and useful Improvement in Harvesters, and we do hereby declare that the following is a full, clear, and exact description of the same, reference being had to the annexed drawings, making part of this specification, in which—

Figure 1 is a vertical section of our improvement, $x\ x$, Fig. 2, showing the plane of section. Fig. 2 is also a vertical section of the same, $y\ y$, Fig. 1, showing the plane of section, the planes of section in the two figures crossing each other at right angles.

Similar letters of reference indicate corresponding parts in the two figures.

Our invention consists in the peculiar means employed for raising and lowering the sickle, whereby the sickle may be made to cut the grass or grain at the desired height from the ground, and the sickle also allowed to conform to the inequalities of the ground, as will be hereinafter fully shown and described.

To enable those skilled in the art to fully understand and construct our invention, we will proceed to describe it.

A represents the main frame of the machine, which is of rectangular form, and has the usual driving-wheel, B, fitted within it, and also gearing to drive or operate the sickle. Any proper device or gearing may be employed for this purpose.

C represents a swinging frame, which works on a shaft, D, placed in the frame A. The swinging frame C is allowed to work freely on the shaft D, and the lower end of the frame C is attached by a joint, $a$, to a horizontal bar, E, (see Fig. 2,) which is formed of two pieces or strips, $b\ b$. The two strips are kept firmly together by bolts $c$, which pass transversely through them and through metal side plates $d$, which are at the outer sides of the strips $b$. The frame C is formed of wood, with metal side plates $e$ attached. The outer ends of the side plates $d$ of the strips $b$ have inclined plates or strips $f$ attached, through the upper ends of which a bolt or rod passes transversely, said bolt or rod having a roller, $g$, upon it, which roller fits in an inclined guide, F, attached to the back end of the frame A. The inner end of one of the side plates, $d$, of the strips $b$ has an inclined plate or strip, $h$, attached to it. The plate or strip $h$ has a friction-roller, $i$, fitted in it, said roller bearing against an inclined plate, $j$, attached to the frame A. Between the two strips $b\ b$ there is fitted a rod or shaft, $k$, to which the finger-bar G is attached. The rod or shaft $k$ is allowed to turn freely between the strips $b\ b$. The fingers $l$, of usual form, are attached to the finger-bar, and the sickle H works through slots in the fingers.

I is a lever which is attached to a shaft, J, on the frame A. The outer end of this lever has a weight, K, attached to it. The shaft J has an arm, L, attached to it, said arm having a roller, $m$, at its outer end, the roller being kept on the frame C by the weighted lever I.

M is a lever which is pivoted to an upright, N, on the frame A. One end of this lever is connected by a chain, O, to the upper end of the plate or strip $h$.

From the above description it will be seen that either end of the sickle may be raised or lowered. For instance, if the outer end is raised, the sickle and finger-bar will cause the shaft $k$ to turn between the two strips $b\ b$, and if the inner end is raised the strips $b\ b$ will raise the plates $f\ f$ and frame C, the upper ends of the plates $f$ being properly guided, in consequence of the roller $g$ working in the guide F.

The sickle may be raised by the driver at any time, in order that it may pass over obstructions, by depressing the outer end of the lever M, said lever being retained by a catch, A'. The weighted lever I causes the sickle to descend and keeps it at the surface of the ground.

The above improvement is simple, efficient, may be cheaply applied, and is not liable to get out of repair.

Having thus described our invention, what we claim as new, and desire to secure by Letters Patent, is—

The frame C, when arranged in respect to the driving-shaft D, and having the bar E attached to its lower end and the strips $f$ attached to the bar E, the upper ends of the strips $f$ having a roller, $g$, attached to them, which roller is fitted and works in a guide, F, the finger-bar G being connected to a shaft, $k$, fitted within the bar E, when the whole is constructed and arranged substantially as shown, for the purpose specified.

J. C. PLUCHE.
L. C. PLUCHE.

Witnesses:
CHAS. W. ROGERS,
LORENZO D. FURBLE.